(12) United States Patent
Sultenfuss et al.

(10) Patent No.: US 10,389,154 B2
(45) Date of Patent: Aug. 20, 2019

(54) POWER STORAGE ADAPTER USING A HIGH EFFICIENCY CHARGING METHOD

(71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 15/631,724

(22) Filed: Jun. 23, 2017

(65) Prior Publication Data

US 2018/0375359 A1    Dec. 27, 2018

(51) Int. Cl.
*H02J 7/00* (2006.01)

(52) U.S. Cl.
CPC ..... *H02J 7/0068* (2013.01); *H02J 2007/0098* (2013.01)

(58) Field of Classification Search
CPC .................................................. H02J 7/0068
See application file for complete search history.

(56) References Cited

U.S. PATENT DOCUMENTS

| | | | |
|---|---|---|---|
| 5,598,327 A | 1/1997 | Somerville et al. | |
| 5,811,895 A | 9/1998 | Suzuki et al. | |
| 6,293,700 B1 | 9/2001 | Lund et al. | |
| 6,477,054 B1 | 11/2002 | Hagerup | |
| 7,243,246 B2 | 7/2007 | Allen et al. | |
| 7,536,569 B2 | 5/2009 | Montero et al. | |
| 7,538,518 B2 | 5/2009 | Wang et al. | |
| 7,545,120 B2 | 6/2009 | Breen et al. | |
| 7,592,716 B2 | 9/2009 | Zhu et al. | |
| 7,989,981 B2 | 8/2011 | Zhang | |
| 8,164,904 B2 | 4/2012 | Matz et al. | |
| 8,188,594 B2 | 5/2012 | Ganesan et al. | |
| 9,166,083 B2 | 10/2015 | Meinel et al. | |
| 9,197,092 B2 | 11/2015 | Verdun et al. | |
| 9,263,912 B2 | 2/2016 | Verdun et al. | |
| 9,300,015 B2 | 3/2016 | Chang et al. | |
| 9,524,018 B2 | 12/2016 | Sultenfuss et al. | |
| 9,568,990 B2 | 2/2017 | Chueh et al. | |
| 9,681,558 B2 | 6/2017 | Chen et al. | |
| 9,693,446 B2 | 6/2017 | Ragg | |
| 9,812,878 B1 | 11/2017 | Stieber et al. | |
| 9,867,275 B2 | 1/2018 | Chen | |

(Continued)

OTHER PUBLICATIONS

Universal Serial Bus, "USB Power Delivery." Retrieved from <http://www.usb.org/developers/powerdelivery/> on Jun. 28, 2017; 3 pages.

(Continued)

*Primary Examiner* — Fritz M Fleming
(74) *Attorney, Agent, or Firm* — Baker Botts L.L.P.

(57) ABSTRACT

A power storage adapter may use a high efficiency charging method when supplying electrical power to a portable information handling system when the power storage adapter is not connected to AC line power. In particular, the power storage adapter may minimize or avoid supplying electrical power when an internal battery of the portable information handling system is in a constant voltage charging regime (or at a given state of charge), in which the electrical power decreases as the state of charge increases.

18 Claims, 5 Drawing Sheets

(56) References Cited

U.S. PATENT DOCUMENTS

| | | | |
|---|---|---|---|
| 9,887,571 | B1 | 2/2018 | Sultenfuss et al. |
| 1,012,876 | A1 | 11/2018 | Vinciarelli |
| 1,018,173 | A1 | 1/2019 | Thompson et al. |
| 2003/0085626 | A1 | 5/2003 | Odaohhara |
| 2004/0075418 | A1* | 4/2004 | Densham ............. H02J 7/0068 320/111 |
| 2004/0125618 | A1 | 7/2004 | Rooij et al. |
| 2004/0135565 | A1 | 7/2004 | Douma et al. |
| 2005/0125709 | A1 | 6/2005 | McKim |
| 2005/0131645 | A1 | 6/2005 | Panopoulos |
| 2005/0174094 | A1 | 8/2005 | Purdy et al. |
| 2005/0275383 | A1 | 12/2005 | Ishishita |
| 2006/0022637 | A1 | 2/2006 | Wang et al. |
| 2007/0079153 | A1 | 4/2007 | Bain et al. |
| 2007/0103110 | A1 | 5/2007 | Sagoo |
| 2007/0200433 | A1 | 8/2007 | Kelty |
| 2007/0248877 | A1 | 10/2007 | Qahoug |
| 2007/0279004 | A1 | 12/2007 | Wang et al. |
| 2008/0222431 | A1 | 9/2008 | Paniagua et al. |
| 2008/0315826 | A1 | 12/2008 | Alberth, Jr. et al. |
| 2009/0001937 | A1* | 1/2009 | Densham ................. H02J 7/00 320/145 |
| 2009/0076661 | A1 | 3/2009 | Pearson et al. |
| 2009/0177906 | A1 | 7/2009 | Paniagua, Jr. et al. |
| 2009/0244944 | A1 | 10/2009 | Jang et al. |
| 2010/0067197 | A1 | 3/2010 | Guccione et al. |
| 2011/0068626 | A1 | 3/2011 | Terlizzi et al. |
| 2011/0225073 | A1 | 9/2011 | Won et al. |
| 2011/0260681 | A1 | 10/2011 | Guccione et al. |
| 2012/0123604 | A1 | 5/2012 | Littrell |
| 2012/0151240 | A1 | 6/2012 | Robinson et al. |
| 2012/0181990 | A1 | 7/2012 | Asakura et al. |
| 2012/0256484 | A1* | 10/2012 | Kemp ................... H02J 7/0045 307/22 |
| 2012/0316695 | A1 | 12/2012 | Chen |
| 2012/0319656 | A1 | 12/2012 | Toma |
| 2013/0043827 | A1* | 2/2013 | Weinstein ............. H02J 7/0027 320/103 |
| 2013/0159792 | A1 | 6/2013 | Brooks et al. |
| 2013/0314039 | A1 | 11/2013 | Weber et al. |
| 2013/0342011 | A1 | 12/2013 | Robinson et al. |
| 2014/0018969 | A1 | 1/2014 | Forbes |
| 2014/0035380 | A1 | 2/2014 | Stevens et al. |
| 2014/0157065 | A1 | 6/2014 | Ong |
| 2014/0210267 | A1 | 7/2014 | Ishida et al. |
| 2014/0214223 | A1 | 7/2014 | Tsunoda et al. |
| 2014/0239882 | A1* | 8/2014 | Yang ..................... H02J 7/041 320/107 |
| 2015/0063473 | A1 | 3/2015 | Nishibayashi |
| 2015/0132615 | A1 | 5/2015 | Yun |
| 2015/0165917 | A1 | 6/2015 | Robers et al. |
| 2015/0364921 | A1 | 12/2015 | Tatsuta et al. |
| 2016/0241148 | A1 | 8/2016 | Kizilyalli et al. |
| 2016/0246316 | A1 | 8/2016 | Lim et al. |
| 2016/0274607 | A1 | 9/2016 | Kudo |
| 2016/0359426 | A1 | 12/2016 | Jitaru et al. |
| 2017/0040815 | A1 | 2/2017 | Todasco |
| 2017/0104330 | A1 | 4/2017 | Nakaishi |
| 2018/0181171 | A1 | 6/2018 | Jang et al. |
| 2018/0233914 | A1 | 8/2018 | Miki et al. |
| 2018/0351399 | A1 | 12/2018 | Frey |
| 2018/0375358 | A1 | 12/2018 | Sultenfuss et al. |
| 2018/0375359 | A1 | 12/2018 | Sultenfuss et al. |
| 2018/0375360 | A1 | 12/2018 | Sultenfuss et al. |
| 2018/0375361 | A1 | 12/2018 | Sultenfuss et al. |
| 2019/0050037 | A1* | 2/2019 | Wang ..................... G06F 1/266 |

OTHER PUBLICATIONS

SMBus, "System Management Bus (SMBus)." Retrieved from <www.smbus.org> on Jun. 28, 2017; 2 pages.

UEFI, "Unified Extensible Firmware Interface (UEFI) Specification" Retrieved from <http://uefi.org>, May 2017; 2899 pages, Jun. 28, 2017.

Wikipedia, "USB." Retrieved from <https://en.wikipedia.org/wiki/USB> on Mar. 19, 2017; 35 pages.

Waffenschmidt, Eberhard. "Qi Coupling Factor." Qi Coupling Factor, www.wirelesspowerconsortium.com/technology/coupling-factor.html, Retrieved Jan. 3, 2018; 5 pages.

Waffenschmidt, Eberhard. "Resonant Coupling." Resonant Coupling, https://www.wirelesspowerconsortium.com/technology/resonant-coupling.html; Retrieved Jan. 3, 2018; 4 pages.

Wow! A true free-positioning 5-phone charger—Wireless Power Consortium Blog. Wireless Power Consortium. Web. <http://www.wirelesspowerconsortium.com/blog/67/wow-a-true-free-positioning-5-phone-charger>; Retrieved Jan. 3, 2018; 6 pages.

Received STIC search report from EIC 2800 searcher John DiGeronimo on Dec. 7, 2017; 31 pages.

Received STIC search report from EIC 2800 searcher Benjamin Martin on Sep. 28, 2017; 14 pages.

\* cited by examiner

POWER STORAGE ADAPTER USING A HIGH EFFICIENCY CHARGING METHOD

BACKGROUND

Field of the Disclosure

This disclosure relates generally to information handling systems and, more particularly, to a power storage adapter using a high efficiency charging method.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed power storage adapter (PSA) includes a PSA port, a PSA battery, and a PSA controller having access to memory media storing instructions executable by the PSA controller. In the power storage adapter, when a portable information handling system is connected to the PSA port to receive first electrical power supplied by the power storage adapter, an AC line power source does not supply electrical power to the power storage adapter, and a first state of charge (SOC) of the PSA battery is above a recharging state of charge, the instructions may be executable by the PSA controller to determine a second state of charge of an internal battery included with the portable information handling system. When the second state of charge indicates that the internal battery is operating in a constant voltage charging regime, the instructions may be executable to discontinue supplying the first electrical power at the PSA port.

In any of the disclosed embodiments of the power storage adapter, the PSA port may be a USB Type-C port, while the instructions to discontinue supplying the first electrical power may further include instructions to perform a soft reset at the PSA port. In the power storage adapter, a first USB power delivery contract in effect between the portable information handling system and the power storage adapter may be terminated.

In any of the disclosed embodiments, the power storage adapter may further include instructions to establish a second USB power delivery contract between the portable information handling system and the power storage adapter to deliver lowest electrical power by the power storage adapter at the PSA port. The lowest electrical power may be zero electrical power.

In any of the disclosed embodiments of the power storage adapter, the instructions to determine the second state of charge may further include instructions to communicate with the portable information handling system via the PSA port to receive information indicative of the second state of charge.

In any of the disclosed embodiments of the power storage adapter, the instructions to determine the second state of charge may further include instructions to determine the first electrical power supplied to the portable information handling system at the PSA port, and, based on a charging curve for the internal battery, correlate the first electrical power to determine the second state of charge.

In any of the disclosed embodiments of the power storage adapter, the second state of charge may be at least 80% when the internal battery is operating in the constant voltage charging regime.

In any of the disclosed embodiments, the power storage adapter may further include instructions to determine that the second state of charge indicates that the internal battery is operating in a constant current charging regime. Responsive to determining the constant current charging regime, the instructions may include instructions to resume supplying the first electrical power to the portable information handling system.

In any of the disclosed embodiments of the power storage adapter, the PSA port may be a USB Type-C port, while the instructions to resume supplying the first electrical power may further include instructions to terminate the second USB power delivery contract, and reestablish the first USB power delivery contract with the portable information handling system.

In a further aspect, a disclosed method is for high efficiency charging using a power storage adapter. When a portable information handling system is connected to a PSA port of a power storage adapter to receive first electrical power supplied by the power storage adapter, an AC line power source does not supply electrical power to the power storage adapter, and a state of charge (SOC) of a PSA battery included with the power storage adapter is above a recharging state of charge, the method may include determining a second state of charge of an internal battery included with the portable information handling system. When the second state of charge indicates that the internal battery is operating in a constant voltage charging regime, the method may include discontinuing supplying the first electrical power at the PSA port.

In any of the disclosed embodiments of the method, the PSA port may be a USB Type-C port, while discontinuing supplying the first electrical power may further include performing a soft reset at the PSA port, wherein a first USB power delivery contract in effect with the portable information handling system is terminated.

In any of the disclosed embodiments, the method may further include establishing a second USB power delivery contract between the portable information handling system and the power storage adapter to deliver zero electrical power at the PSA port.

In any of the disclosed embodiments of the method, determining the second state of charge may further include communicating with the portable information handling system via the PSA port to receive information indicative of the second state of charge.

In any of the disclosed embodiments of the method, determining the second state of charge may further include determining the first electrical power supplied to the portable information handling system at the first PSA port, and, based on a charging curve for the internal battery, correlating the first electrical power to determine the second state of charge.

In any of the disclosed embodiments of the method, the second state of charge may be at least 80% when the internal battery is operating in the constant voltage charging regime.

In any of the disclosed embodiments, the method may further include determining that the second state of charge indicates that the internal battery is operating in a constant current charging regime. Responsive to determining the constant current charging regime, the method may include resuming supplying the first electrical power to the portable information handling system.

In any of the disclosed embodiments of the method, the PSA port may be a USB Type-C port, while resuming supplying the first electrical power may further include terminating the second USB power delivery contract, and reestablishing the first USB power delivery contract with the portable information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, and 5 wherein like numbers are used to indicate like and corresponding parts.

Figure 1:
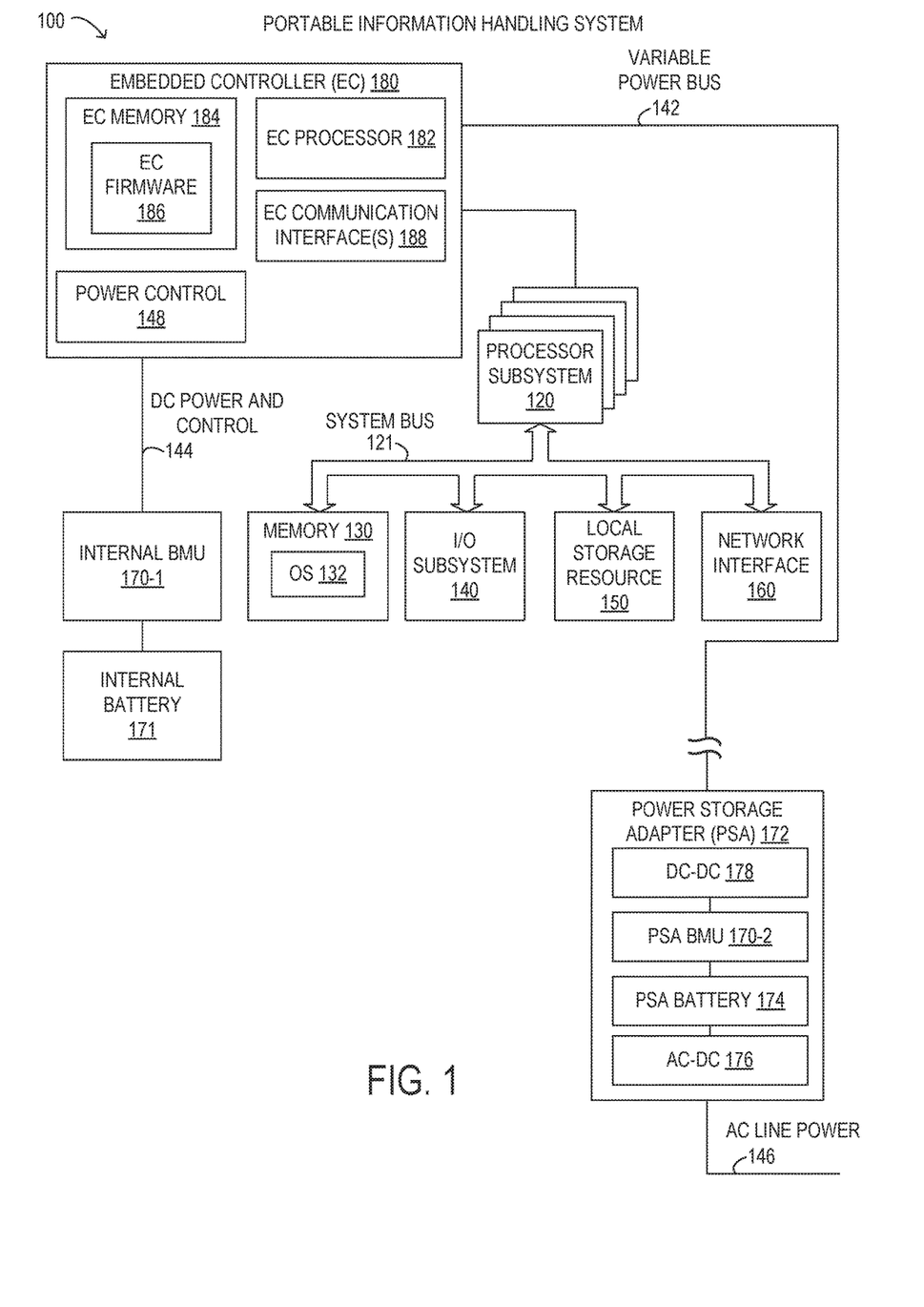
FIG. 1 is a block diagram of selected elements of an embodiment of a portable information handling system.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170-1 that manages an internal battery 171. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power storage adapter 172, internal BMU 170-1, and to portable information handling system 100. In some embodiments, power control 148 may be implemented as a separate controller external to embedded controller 180. For example, when variable power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route electrical power and communicate with internal BMU 170-1 via DC power and control 144, which may represent suitable connections between embedded controller 180 and internal BMU 170-1, for example. It is noted that in some embodiments, at least certain portions of power control 148 may be implemented using EC firmware 186, such as specialized executable instructions for power management and control.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

| USB Power Delivery revision 2.0, version 1.2 source power rules. | | | | |
|---|---|---|---|---|
| Source Output Power [W] | Current [A] at +5 V DC | Current [A] at +9 V DC | Current [A] at +15 V DC | Current [A] at +20 V DC |
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level. The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU 170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 1 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages. Also, an output DC voltage from AC-DC converter 176 may be directly supplied to variable power bus 142, such as to fulfil a power contract, as described above. Additional details of power storage adapter 172 are described below with respect to FIG. 2.

As will be described in further detail herein, in operation, power storage adapter 172 may supply portable information handling system 100 with electrical power, as governed by a power delivery contract as described above. However, under certain conditions, the power delivery contract may not be desirable to maintain optimal efficiency and long run times under battery power. For example, when power storage adapter 172 is not connected to AC line power 146, PSA battery 174 is available as a power source for supplying electrical power to portable information handling system 100. Furthermore, during certain charging regimes, such as when internal battery 171 is at greater than about 80% SOC, portable information handling system 100 may draw substantially less electrical power than specified in the power delivery contract. When portable information handling system 100 draws a relatively low electrical power, such as less than about 1 Watt, the efficiency for supplying electrical power from internal battery 171 is substantially reduced, because certain losses due to inefficiency, such as thermal losses, will comprise a much greater relative portion of the total output power supplied by power storage adapter 172.

Therefore, when power storage adapter 172 is not connected to AC line power 146 and the electrical power actually supplied to portable information handling system 100 is relatively low, power storage adapter 172 may independently decide to terminate the power storage contract and to wait until such time as internal battery 171 will draw greater electrical power for charging, for example, when internal battery 171 is charging in a constant current charging regime. Further details of power storage adapter 172 using a high efficiency charging method are described below.

Figure 2:
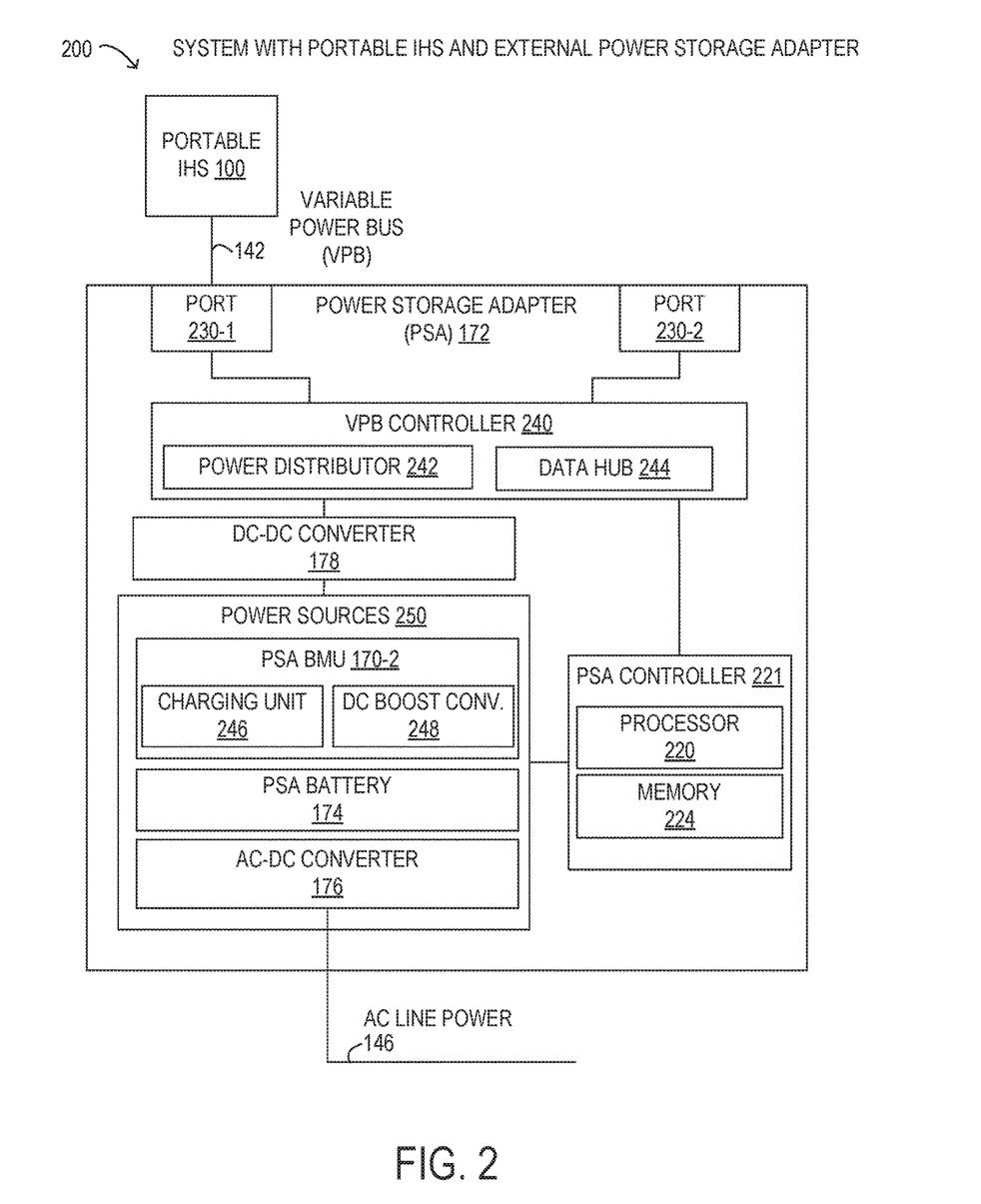
FIG. 2 is a block diagram of selected elements of an embodiment of a portable information handling system with an external power storage adapter.

Referring now to FIG. 2, selected elements of an embodiment of a system 200 with portable information handling system 100 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, power storage adapter 172 is coupled to portable information handling system 100 via variable power bus (VPB) 142, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, and two ports 230, as well as a PSA controller 221 comprising processor 220 and memory 224. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VBP controller 240 is depicted in FIG. 2 in an implementation with two ports 230-1 and 230-2 that support variable power bus 142. As noted above, variable power bus 142 may be compatible with USB Type-C specifications promulgated by USB IF. Accordingly, in particular embodiments, port 230-1 may be a USB Type-C port. In different embodiments, port 230-1 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power bus 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100 via port 230-1. VPB controller 240 may also establish another power contract to supply DC power to another device coupled to port 230-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In FIG. 2, data hub 244 may represent electronic functionality to manage various VPB connections over variable power bus 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device consuming the electrical power provided by a battery. For example, a portable information handling system may consume power for components such as one or more displays, processors, storage media, memory, or other components.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248.

In some embodiments, portable information handling system 100 may communicate with power storage adapter 172 to instruct PSA BMU 170-2 to charge the battery cells of PSA battery 174. As previously noted, PSA BMU 170-2 may send information to portable information handling system 100, such as the cell configuration, the state of charge of the battery, or other information. Portable information handling system 100 may communicate with PSA BMU 170-2 using a system management bus (not shown), for example System Management Bus (SMBus) promulgated by SBS Implementers Forum (www.smbus.org), in some embodiments.

In operation for a high efficiency charging method, power storage adapter 172 may monitor a current supplied to port 230-1 when connected to portable information handling system 100 via variable power bus 142. Port 230-1 and variable power bus 142 may be compatible with USB Type-C to establish USB power delivery contracts between portable information handling system 100 and power storage adapter 172. The current monitored flowing to portable information handling system 100 at port 230-1 may be under the USB power delivery contract. However, portable information handling system 100 may draw substantially less power than specified in the USB power delivery contract, which may be undesirable for power storage adapter 172 to supply when power storage adapter 172 is not connected to AC line power 146, because of the inefficiency in providing low levels of electrical power, due to high relative losses in the power circuitry of power storage adapter 172. Thus, the continued supply of low levels of electrical power under such conditions would result in a particularly shortened run time of PSA battery 174, as compared to a supply of electrical power at higher levels by power storage adapter 172. Therefore, power storage adapter 172 may terminate the USB power delivery contract, establish a zero power delivery contract at port 230-1. When power storage adapter 172 detects or determines that a SOC of internal battery 171 is below a specified threshold, such as a charging SOC for internal battery 171, power storage adapter 172 may terminate the zero power delivery contract, and establish the previous USB power delivery contract and begin supplying power to portable information handling system 100 to charge internal battery 171 in a more efficient charging regime, such as a constant current charging regime.

Figure 3:
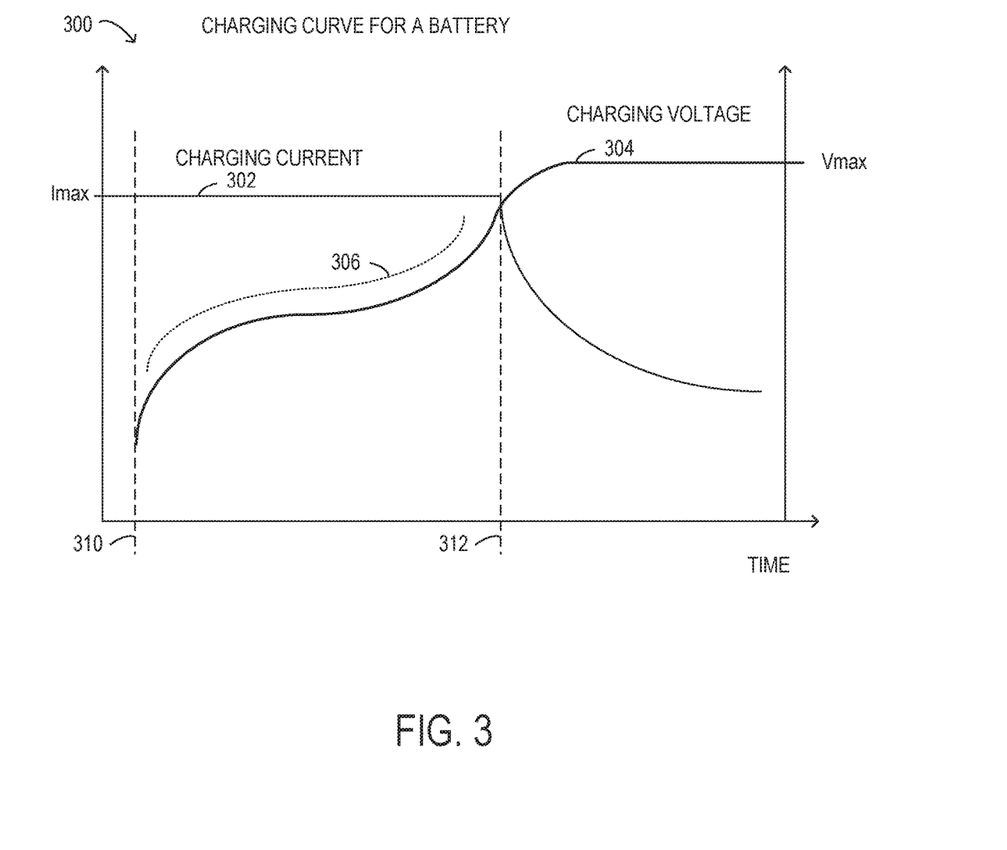
FIG. 3 is a plot showing selected elements of a charging curve for an information handling system battery.

FIG. 3 illustrates a charging curve 300 for a battery, such as internal battery 171 or PSA battery 174. Charging curve 300 is schematically illustrated and is not drawn to scale or perspective. Charging curve 300 may be implemented by BMU 170, for example, using charging unit 246 (see FIG. 2). Charging curve 300 depicts how a charging current 302 and a charging voltage 304 respond over time to various conditions. Specifically, at time 310, it is assumed that the battery is discharged and is charged by supplying charging current 302 that is constant, given by Imax, which is a maximum charging current. In the constant current charging regime between time 310 and time 312, charging voltage 304 may increase from a low value to a higher value as the SOC for the battery increases. At time 312, charging voltage 304 may approach a maximum value, given by Vmax, and may remain constant after time 312. At about time 312, meanwhile, charging current 302 may begin to decrease as the SOC for the battery increases at a lower rate. After time 312, in a constant voltage charging regime, charging current 302 may taper off until at some point, the SOC approaches a maximum value, and no further charging occurs.

As noted above, time 312 may distinguish between a previous constant current charging regime and a subsequent constant voltage charging regime. Time 312 may represent a point where the SOC of the battery is at about 80%. After time 312, the power draw for charging may begin to decrease sharply as charging current 302 decreases sharply. Therefore, for high efficiency charging, waiting to charge the battery until the SOC is in the constant current regime may be desirable. In some embodiments, time 312 may correspond to a recharging SOC, which may be a lower SOC threshold to indicate that charging of the battery should be performed.

Furthermore, when power storage adapter 172 is connected to portable information handling system 100, it is desirable for power storage adapter 172 to be aware of the SOC of internal battery 171. In some embodiments, power storage adapter 172 and portable information handling system 100 may communicate bidirectionally using variable power bus 142 to exchange various information, including an SOC for each of the respective batteries (internal battery 171 and PSA battery 174). In particular, when power storage adapter 172 and portable information handling system 100 include compatible communication and monitoring functionality to each other, power storage adapter 172 may simply query information handling system 100 for the SOC of internal battery 171 at any time.

However, when power storage adapter 172 and portable information handling system 100 do not include compatible communication and monitoring functionality to each other, power storage adapter 172 may still be able to ascertain the SOC of internal battery 171 by monitoring a current and a voltage at port 230-1 where portable information handling system 100 is connected (see FIG. 2). In some embodiments, power storage adapter 172 may monitor an electrical power at port 230-1. Then, the monitored current, voltage, or electrical power, can be correlated to charging curve 300 for internal battery 171. Power storage adapter 172 may know the values of charging curve 300 for internal battery 171 by recording the values during a previous charge cycle or previous operation with portable information handling system 100. In this manner, power storage adapter 172 may correlate the SOC of internal battery 171 without directly communicating with portable information handling system 100 to request or query the SOC. It is noted that the product of charging current 302 and charging voltage 304 will result in a charging power.

Also shown in FIG. 3 is a boost charging voltage 306. Specifically, charging unit 246 may apply boost charging voltage 306 to improve a charging efficiency, for example, by reducing an amount of electrical power consumed during charging, as compared with supplying constant charging voltage Vmax.

In addition to charging curve 300, other types of charging methods and corresponding curves may be applied in different implementations. For example, a multistep constant current charging method may be used instead of charging current 302 having a single constant value until time 312. In the multistep constant current charging method, a step-wise reduction in the charging current from Imax to one or more lower current values may be used. In some cases, a multistep constant current-constant voltage regime may be repeated with shorter constant current and constant voltage periods that alternate, optionally with varying values for the charging current and the charging voltage at each step. In another case, pulse charging using current may be performed until an upper voltage threshold is reached, followed by discharging until a lower voltage threshold is reached, and may be repeated in this manner. In such cases, there may be no particular time 312 as shown in charging curve 300 that corresponds to 80% SOC and another trigger condition for the methods described herein may be used, such as a current threshold, a voltage threshold, or an SOC threshold, for example.

Additionally, a rate of charge, such as given by the actual value of Imax, may change the relationship to SOC and voltage in some batteries. In particular, when charging at a high rate (corresponding to a high charging current), a battery cell may reach the constant voltage condition before reaching 80% SOC. In such a case, making decision to stop charging based on time 312 or the begin of constant voltage charging mode may be premature, because the energy transfer to the internal battery may still be desirable and efficient. In another example, if a battery has a high energy storage capacity, then the battery may still accept a large energy transfer even though the constant voltage charging mode has been reached. In such cases, in an alternate condition to 80% SOC for triggering charging (or not charging), the methods described herein may comprise determining an absolute value of energy transfer to the battery, for example, with consideration of charging losses to the battery. Then, a minimum threshold for the absolute value of energy transfer may be used as a trigger criteria for the methods described herein.

Figure 4:
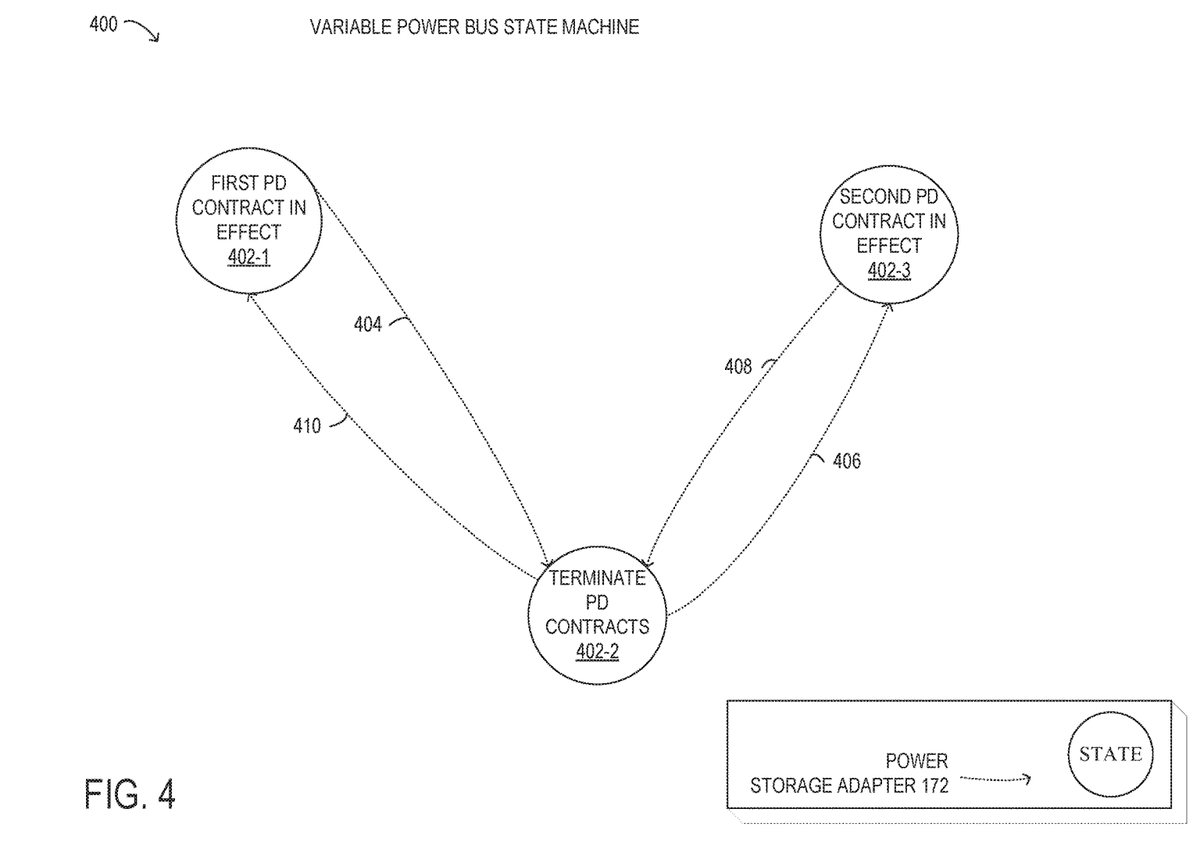
FIG. 4 is an embodiment of a variable power bus state machine for a power storage adapter using a high efficiency charging method.

Referring now to FIG. 4, a variable power bus state machine 400 is illustrated. Variable power bus state machine 400 describes states of power storage adapter 172 for performing a high efficiency charging method, as described herein. In various embodiments, the high efficiency charging method described herein may be implemented with fewer or more elements than depicted in variable power bus state machine 400.

In variable power bus state machine 400, states 402 represent certain power states of power storage adapter 172 when not connected to AC line power 146 and connected to portable information handling system using a port 230. Port 230 may be a USB Type-C port and the power delivery contracts described in variable power bus state machine 400 may be USB power delivery contracts. Prior to state 402-1, portable information handling system 100 may establish a first power delivery contract with power storage adapter 172 for a nominal amount of power, such as 30 Watts, in one example. Then, power storage adapter 172 may be disconnected from AC line power 146 and may begin supplying power using PSA battery 174 as a power source, as long as PSA battery 174 has a SOC greater than a minimum SOC, such as the recharging SOC described above. Then, power storage adapter 172 may enter state 402-1 (first power delivery (PD) contract in effect). From state 402-1, power storage adapter 172 may determine the SOC of internal battery 171. Power storage adapter 172 may then correlate the SOC of internal battery 171 to charging curve 300 for internal battery, as described above with respect to FIG. 3. In some embodiments, power storage adapter 172 may determine that internal battery 172 is operating in a constant current regime. Power storage adapter 172 may detect that the state of charge is less than about 80%, in some embodiments. In certain embodiments, power storage adapter 172 may recognize that the electrical power drawn by internal battery 171 is increasing (constant current regime) or decreasing (constant voltage regime). From state 402-1, when power storage adapter 172 detects that the SOC of internal battery 171 is greater than about 80%, or that internal battery 171 is in a constant voltage charging regime, or that the electrical power supplied to internal battery is decreasing (among other indications), at action 404, power storage adapter 172 may terminate the first PD contract and enter state 402-2. From state 402-2, power storage adapter 172, with action 406, may negotiate a second PD contract with portable information handling system 100. The second PD contract may be to deliver lowest electrial power according to Table 1 (or to deliver zero electrical power) at port 230-1. When the second PD contract is in effect, power storage adapter 172 may remain in state 402-3. From state 402-3, when power storage adapter 172 detects that the SOC of internal battery 171 is less than about 80%, or that internal battery 171 is in a constant current charging regime, at action 408, power storage adapter 172 may terminate the second PD contract and re-enter state 402-2. From state 402-2, power storage adapter 172, with action 410, may re-negotiate and re-establish the first PD contract with portable information handling system 100 and re-enter state 402-1. It is noted that at action 410, in some embodiments, power storage adapter 172 may negotiate and establish a third PD contract (not shown) that is different from the first PD contract to supply a non-zero level of electrical power different from the first PD contract.

Figure 5:
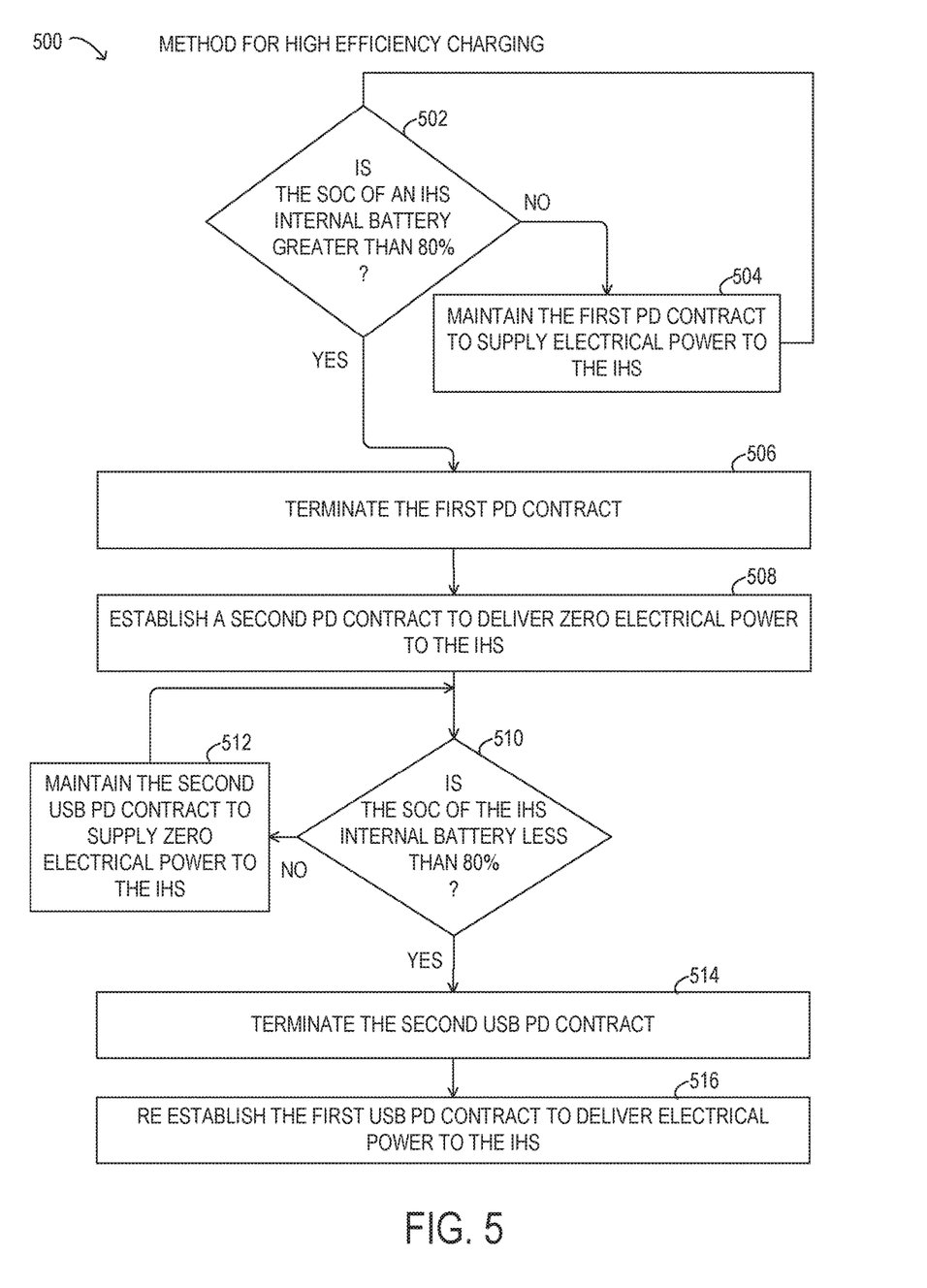
FIG. 5 is a flow chart of selected elements of a method for high efficiency charging.

Referring now to FIG. 5, a flow chart of selected elements of an embodiment of method 500 for a high efficiency charging method, as described herein, is depicted in flow-chart form. Method 500 may be performed using portable information handling system 100, in conjunction with power storage adapter 172 (see FIGS. 1 and 2) and, in particular, by PSA controller 221 Method 500 may be performed when power storage adapter 172 is not receiving electrical power from AC line source 146 and is connected to portable information handling system (IHS) 100 via port 230-1 to variable power bus 142 and is supplying electrical power as governed by a first power delivery (PD) contract. It is noted that certain operations described in method 500 may be optional or may be rearranged in different embodiments.

Method 500 may begin at, step 502, with a decision whether the SOC of an IHS internal battery is greater than 80%. The determination of the SOC in step 502 may be performed using various methods, as described previously, including direct method of communication and indirect methods of power measurement at port 230-1 using sensors at power storage adapter 172. When the result of step 502 is NO, and the SOC of the IHS internal battery is not greater than 80%, method 500 may proceed to step 504 to maintain the first PD contract to supply electrical power to the IHS. After step 504, method 500 may loop back to step 502. When the result of step 502 is YES, and the SOC of the IHS internal battery is greater than 80%, method 500 may proceed to step 506 by terminating the first PD contract. At step 508, a second PD contract is established to deliver zero electrical power to the IHS. In some implementations, instead of zero electrical power in step 508, the second PD contract may be established using a lowest power value that enables USB communication to be maintained. For example, from Table 1, a minimum USB PD contract may be established for 500 mA at +5V DC, which is a lowest power value that may be used instead of zero electrical power in some implementations with USB PD contracts, such as when zero electrical power is not supported.

At step 510, a decision is made whether the SOC of the IHS internal battery is less than 80%. When the result of step 510 is NO, and the SOC of the IHS internal battery is less than 80%, method 500 may proceed to step 512 to maintain the second PD contract to supply zero electrical power to the IHS. When the result of step 510 is YES, and the SOC of the IHS internal battery is less than 80%, method 500 may proceed to step 514 by terminating the second PD contract. At step 516, the first PD contract is re-established to deliver electrical power to the IHS. In some embodiments, the non-zero electrical power delivered in step 516 may be different than prior to begin of method 500.

As disclosed herein, a power storage adapter may use a high efficiency charging method when supplying electrical power to a portable information handling system when the power storage adapter is not connected to AC line power. In particular, the power storage adapter may minimize or avoid supplying electrical power when an internal battery of the portable information handling system is in a constant voltage charging regime (or at a given state of charge), in which the electrical power decreases as the SOC increases.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power storage adapter (PSA), comprising:
   a PSA port;
   a PSA battery; and
   a PSA controller having access to memory media storing instructions executable by the PSA controller, wherein when a portable information handling system is connected to the PSA port to receive first electrical power supplied by the power storage adapter, an AC line power source does not supply electrical power to the power storage adapter, and a first state of charge of the PSA battery is above a recharging state of charge, the instructions are executable by the PSA controller to:
  determine a second state of charge of an internal battery included with the portable information handling system; and
  when the second state of charge indicates that the internal battery is operating in a constant voltage charging regime, discontinue supplying the first electrical power at the PSA port.

2. The power storage adapter of claim 1, wherein:
the PSA port is a USB Type-C port; and
the instructions to discontinue supplying the first electrical power further comprise instructions to:
  perform a soft reset at the PSA port, wherein a first universal serial bus (USB) power delivery contract in effect between the portable information handling system and the power storage adapter is terminated.

3. The power storage adapter of claim 2, further comprising instructions to:
  establish a second USB power delivery contract between the portable information handling system and the power storage adapter to deliver lowest electrical power by the power storage adapter at the PSA port.

4. The power storage adapter of claim 3, wherein the lowest electrical power is zero electrical power.

5. The power storage adapter of claim 3, further comprising instructions to:
  determine that the second state of charge indicates that the internal battery is operating in a constant current charging regime;
  responsive to determining the constant current charging regime, resume supplying the first electrical power to the portable information handling system.

6. The power storage adapter of claim 5, wherein:
the PSA port is a USB Type-C port; and
the instructions to resume supplying the first electrical power further comprise instructions to:
  terminate the second USB power delivery contract; and
  reestablish the first USB power delivery contract with the portable information handling system.

7. The power storage adapter of claim 1, wherein the instructions to determine the second state of charge further comprise instructions to:
  communicate with the portable information handling system via the PSA port to receive information indicative of the second state of charge.

8. The power storage adapter of claim 1, wherein the instructions to determine the second state of charge further comprise instructions to:
  determine the first electrical power supplied to the portable information handling system at the PSA port; and
  based on a charging curve for the internal battery, correlate the first electrical power to determine the second state of charge.

9. The power storage adapter of claim 1, wherein the second state of charge is at least 80% when the internal battery is operating in the constant voltage charging regime.

10. A method, comprising:
  when a portable information handling system is connected to a PSA port of a power storage adapter to receive first electrical power supplied by the power storage adapter, an AC line power source does not supply electrical power to the power storage adapter, and a first state of charge of a PSA battery included with the power storage adapter is above a recharging state of charge,
  determining a second state of charge of an internal battery included with the portable information handling system; and
  when the second state of charge indicates that the internal battery is operating in a constant voltage charging regime, discontinuing supplying the first electrical power at the PSA port.

11. The method of claim 10, wherein the PSA port is a USB Type-C port, and wherein discontinuing supplying the first electrical power further comprises:
  performing a soft reset at the PSA port, wherein a first universal serial bus (USB) power delivery contract in effect with the portable information handling system is terminated.

12. The method of claim 11, further comprising:
  establishing a second USB power delivery contract between the portable information handling system and the power storage adapter to deliver lowest electrical power at the PSA port.

13. The method of claim 12, wherein the lowest electrical power is zero electrical power.

14. The method of claim 12, further comprising:
  determining that the second state of charge indicates that the internal battery is operating in a constant current charging regime;
  responsive to determining the constant current charging regime, resuming supplying the first electrical power to the portable information handling system.

15. The method of claim 14, wherein the PSA port is a USB Type-C port, and resuming supplying the first electrical power further comprises:
  terminating the second USB power delivery contract; and
  reestablishing the first USB power delivery contract with the portable information handling system.

16. The method of claim 10, wherein determining the second state of charge further comprises:
  communicating with the portable information handling system via the PSA port to receive information indicative of the second state of charge.

17. The method of claim 10, wherein determining the second state of charge further comprises:
  determining the first electrical power supplied to the portable information handling system at the first PSA port; and
  based on a charging curve for the internal battery, correlating the first electrical power to determine the second state of charge.

18. The method of claim 10, wherein the second state of charge is at least 80% when the internal battery is operating in the constant voltage charging regime.

* * * * *